United States Patent [19]

Yagishita

[11] Patent Number: 4,762,624

[45] Date of Patent: Aug. 9, 1988

[54] APPARATUS AND METHOD FOR FILTRATION AND CONCENTRATION OF SUSPENSION

[76] Inventor: Aisaburo Yagishita, 5-2, Shinpocho 4 chome, Chikusa-ku, Nagoya-shi, Aichi 464, Japan

[21] Appl. No.: 11,435

[22] Filed: Jan. 29, 1987

[51] Int. Cl.$^4$ .............................................. B01D 37/02
[52] U.S. Cl. ...................................... 210/778; 210/193
[58] Field of Search ........................ 210/777, 778, 193

[56] References Cited

U.S. PATENT DOCUMENTS

| | | | |
|---|---|---|---|
| 3,907,681 | 9/1975 | Corrigan et al. | 210/193 |
| 3,997,441 | 12/1976 | Pamplin | 210/777 |
| 4,160,732 | 7/1979 | Maffet | 210/777 |

*Primary Examiner*—Frank Sever
*Attorney, Agent, or Firm*—Lowe, Price, LeBlanc, Becker & Shur

[57] ABSTRACT

A method and apparatus for filtering/concentrating a raw liquid such as industrial waste water or suspension of various kinds. Such raw liquid is additionally dispersed with grains in advance before being subjected to a cross flow filtration in which a tubular filtering member is used. The raw liquid is supplied through the tubular member under pressure. Since the tubular filtering member is provided with a guide member which guides the supplied raw liquid spirally therealong, suspended matter or suspended particles will not stay on the filtering surface. The size of the grains is less than one third the diameter of the tubular member in case where said grains have a specific gravity larger than the raw liquid. If the grains have a specific gravity smaller than the raw liquid, the grain size may vary from one tenth to nine tenths the tubular filtering member.

3 Claims, No Drawings

APPARATUS AND METHOD FOR FILTRATION AND CONCENTRATION OF SUSPENSION

BACKGROUND OF THE INVENTION

The present invention relates to an apparatus for filtering and concentrating a suspension in general or a liquid which contains suspended solids therein and to a method therefor, and more particularly to a method of efficiently concentrating a suspension which has fine suspended particles therein.

In a concentrating technique by filtering a liquid that contains coarse suspended matter therein, in general, the filtrate is separated by using a mesh, a woven fabric or a nonwoven fabric as a filtering member. In the case of treating a liquid containing fine suspended matter therein, however, if use is made of a filtering member having a small openings therein to provide fine filtration, the filtering member is easily obstructed to lower the filtering efficiency.

When a liquid containing fine suspended matter therein is to be filtered and collected, an ultrafiltering method using a tubular filtering membrane which has tiny openings is used. Namely, the raw liquid or suspension to be treated permeates through the tubular filtering membrane while the raw liquid flows inside the tubular filtering membrane, and the filtrate that is filtered out of the tube is collected. In such a crossflow method, i.e., the method which performs the filtration by flowing the raw liquid in a direction in parallel with the filtering member, the problem of obstructing is not very serious when the raw liquid has a low concentration. However, as the raw liquid is concentrated to make the concentration of the suspended matter higher, the problem of obstructing appears conspicuous and the filtering efficiency drops rapidly. Moreover, when suspended matter has a high concentration, the filtering member must be washed frequently.

Therefore, it had not been considered advantageous to employ the crossflow-type filtering method as long as it is possible to employ an ordinary filtering method of the batch type or the semi-batch type, i.e., as long as it is allowed to employ the method in which the raw liquid is flowed against the filtering member to separate it into a filtrate and a cake, until the cake builds up to such an extent removal thereof from the filtering member is needed.

SUMMARY OF THE INVENTION

The present invention is to provide an apparatus and method for filtration and concentration, which makes it possible to continuously carry out the filtration for extended periods of time of high concentration suspension that has so far impossible by preventing the cake from accumulating on the inner or outer surface of the filtering tube in the crossflow method, and which makes it possible to economically collect the filtrate and to concentrate the suspension on the other hand. The present invention further provides a method of filtration and concentration of a suspension.

DESCRIPTION OF THE EMBODIMENT

The above-mentioned object of the present invention is achieved by using an apparatus for filtration and concentration, comprising a tubular filtering member which has a fluid inlet port at one longitudinal end thereof, a fluid outlet port at the other longitudinal end thereof, and which has a filtering layer formed on the side wall thereof, a fluid collecting chamber provided on the outside or on the inside of said tubular filtering member, and a guide member which is provided on the inside or on the outside of said tubular filtering member to guide a fluid in such a way that it is swirled along the filtering layer. Before supplying a suspension under pressure to the above-mentioned apparatus for filtration and concentration treatment, said suspension is intentionally dispersed with grains. In case where said grains have a greater specific gravity than said suspension to be treated, the diameter of said grains is preferably less than one third the diameter of the tubular filtering member. On the other hand, in case where said grains have a smaller specific gravity than said suspension, the diameter of the grains to be dispersed in the suspension may vary within the range of one tenth to nine tenths the diameter of the tubular filtering member. In the latter case, the diameter of said grains may be uniform or not so long as the grains have the shape-recovering property or resiliency.

The tubular filtering member used in the filtering-/concentrating apparatus of the present invention preferably has openings therein having the diameter selected depending upon the suspended matter in the raw liquid that is to be treated. When the suspended solids have large diameters, there is used a porous plate, a woven mesh or a knitted mesh etc. When the suspended solids have small diameters, there is used, a woven fabric, a nonwoven fabric, a filtering paper, or a sintered plate etc. It is allowable, as a matter of course, to use a filtering membrane having fine pores that has been employed in the ultrafiltration method. To cope with the pressure of the raw liquid that flows within the tube, the tubular filtering member may be provided, on the outside or inside thereof, with a tubular reinforcing member which supports the filtering member.

A liquid collecting member is provided on the outside or the inside of the tubular filtering member to collect the filtrate that is filtered by the filtering member. That is, the tubular filtering member is accommodated in a tubular or a cell-like container which is closed or is partly opened, both ends of the tubular filtering member being desirably supported by the walls of the container. A preferred example of the container consists of a vertical or a lateral cylinder, and a single or a plurality of tubular filtering members are provided penetrating from one end thereof through up to the other end thereof.

The guide member is provided on the inside or on the outside of the tubular filtering member spanning from an end of the filtering area to the other end thereof, so that the suspension will flow while being swirled inside or outside the tube. The guide member should desirably be composed of a corrosion-resistant material such as a metal, a ceramic or a plastic. The guide member may have a shape of a ribbon that is spirally formed, or of a twisted plate. Further, a plurality of parts may be coupled together to form the guide member. The direction of turn may be either clockwise or counterclockwise. Either one of the above turning directions should be maintained from one end of the filtering area to the other end thereof, but should not be reversed.

The suspended-matter-containing raw liquid to be supplied to the filtering/concentrating apparatus of the invention equipped with the tubular filtering member, the liquid collecting chamber and the guide member, is additionally dispersed with grains having specific gravities larger than that of the raw liquid and having diameters smaller than one third the diameter of the tubular filtering member, or is additionally dispersed with grains having specific gravities smaller than that of the raw liquid, having uniform or not-uniform diameters over a range of from one tenth to nine tenths of the diameter of the tubular filtering member, and having shape recovering property or resiliency.

The grains may have any property as long as they flow smoothly through a gap between the tubular filtering member and the guide member that is provided inside or outside the tubular filtering member as well as they do not scratch these members when they flow.

Examples of the added grains may be of ceramics in a powdery form or pulverized form, a soft sponge in a form, a synthetic resin in a granular form, or diatomaceous earth. Preferably used are those grains that exhibit large specifc gravities when their diameters are small or that exhibit relatively small specific gravities when their diameters are large. Moreover, they must be easily mixed and dispersed in the raw liquid by stirring therein, and must be pumped out together with the raw liquid without incurring trouble.

When supplied to the filtering concentrating apparatus of the present invention, the thus prepared raw liquid flows while being swirled in a predetermined spiral direction from an end of the tubular filteing member to the other end thereof, and the filtrate which has penetrated through the wall of the filtering member is recovered by the liquid collecting chamber. The suspended solids meanwhile captured on the surface of the filtering material will not stay on the filtering surface but are mostly carried away by the raw liquid that flows in parallel with the filtering surfaces. Therefore, the liquid that flows out from the end of the tubular filtering member contains the suspended solids in a high concentration. As the raw liquid flows along the wall surface of the filtering member while being swirled by the guide member that is provided inside or outside the tubular filteing member, the grains additionally disperesed in the raw liquid rolls on the wall surfaces of the filteing member. Therefore, the suspended solids will not stay on the filteing surfaces, and the oeration of filtration and concentration can be continuously performed for extended periods of time.

WORKING EXAMPLE

A support tube was prepared by forming many holes having a diameter of about 3 mm in the wall of an acrylic resin tube which has an inner diameter of about 20 mm and a length of 300 mm, inserting into said resin tube knitted fabric cylinders the inner surface of which had been made fluffy, and installing further therewithin tube a twisted plate which is comprised of a polyethylene and has about a one-half pitch. The thus constituted filtering member was mounted in the liquid collecting chamber constituted by a thick acrylic resin tube.

The raw liquid was prepared in an amount of 5000 liters by suspending calcium carbonate and magnesium hydroxide in the salt water of a concentration of about 35% such that the proportion of the suspended solids to the salt water is about 20 mg/l. To the thus prepared liquid was added, as grains having the function of filtering assistant, graphite particles in a proportion of about 10 to 20 g/l, the graphite particles having particle diameters of from 0.5 to 2 mm, and having specific gravities of 2.2 to 2.4. Thereafter, the graphite particles were dispersed in the mixture using a stirrer.

The raw liquid added with the graphite particles as mentioned above was circulated in the filtering member under a pressure of 0.5 kg/cm$^2$ using a slurry pump. The amount of the raw liquid supplied was 230/min, and the apparent flow velocity in the filtering member at this moment was 300 cm/sec.

The filtering rate of the filtrate was, first 1 m$^3$/m$^2$/hr, and the amount of the filtrate dropped to 0.8 m$^3$/m$^2$/hr after the operation was continuously performed for 300 hours. The operation, however, could be continued sufficiently.

On the other hand, when the raw liquid in which the grains had been dispersed was supplied under the same conditions as mentioned above to the apparatus which did not have a twisted plate to work as a guide member in the tubular filtering material, the amount of the filtrate dropped to 0.8 m$^3$/m$^2$/hr after the operation was continued for 150 hours. Although the pressure for supplying the raw liquid was increased to 1 kg/cm$^2$, the amount of the filtrate dropped to 0.5 m$^3$/m$^2$/hr after the operation was continued for another 100 hours. Therefore, the operation was discontinued.

Further, the operation was carried out under the same conditions as described above with the exception that the guide member was removed from the tubular filtering member and the grains was not additionally dispersed. In this case, the amount of the filtrate that filtered out dropped to 0.5 m$^3$/m$^2$/hr after the operation was continued for 150 hours. Although the pressure for supplying the raw liquid was increased to 1 kg/cm$^2$, the filtering operation operation had to be stopped after another 10 hours have passed, and the filtering member had to be washed.

As described above, if the filtration is carried out using the filtration/concentration apparatus of the present invention in accordance with the method of the present invention, the cake is prevented from accumulating on the filtering member, and the operation can be continued for extended periods of time, making it possible to economically collect the filtrate in the crossflow filtration system.

What is claimed is:

1. A method of filtering/concentrating a raw liquid having a solids concentration of up to over 35% comprising the steps of enabling crossflow filtration of said raw liquid by adding grains in a raw liquid containing therein suspended matter, suspended particles or the like;

supplying under pressure said grain-added raw liquid along a tubular filtering member on a first radial side thereof, said grains having a diameter less than one third said tubular member in case where said grains have a specific gravity larger than said raw liquid, said grains having a diameter ranging from one tenth to nine tenths the tubular filtering member in case where said grains have a specific gravity smaller than said raw liquid;

guiding said grain-added raw liquid spirally along the tubular filtering member on said first radial side; and collecting at least one of a concentrated liquid on the first radial side and a filtrate on a second radial side of tubular filtering member.

2. A method according to claim 1, wherein said first radial side extends inside the tubular filtering member, said second raidal side extending outside the tubular filtering member.

3. A method according to claim 1, wherein said first radial side extends outside the tubular filtering member, said second radial side extending inside the tubular filtering member.

* * * * *